United States Patent
Abe et al.

(10) Patent No.: US 8,371,651 B2
(45) Date of Patent: Feb. 12, 2013

(54) CHILD SEAT MOUNTABLE VEHICLE SEAT

(75) Inventors: Katsuhiko Abe, Tochigi (JP); Tsutomu Matsuzaki, Tochigi (JP)

(73) Assignee: T.S. Tech Co., Ltd., Saitama (JP)

( * ) Notice: Subject to any disclaimer, the term of this patent is extended or adjusted under 35 U.S.C. 154(b) by 142 days.

(21) Appl. No.: 12/978,881

(22) Filed: Dec. 27, 2010

(65) Prior Publication Data

US 2011/0156460 A1 Jun. 30, 2011

(30) Foreign Application Priority Data

Dec. 28, 2009 (JP) .................................. 2009-297670

(51) Int. Cl.
*B60N 2/28* (2006.01)
(52) U.S. Cl. ....................................................... 297/253
(58) Field of Classification Search .................... 297/253
See application file for complete search history.

(56) References Cited

U.S. PATENT DOCUMENTS 6,416,128 B1 * 7/2002 Fujii ........................ 297/253 X

FOREIGN PATENT DOCUMENTS

JP 2002-301963 A 10/2002

* cited by examiner

*Primary Examiner* — Rodney B White
(74) *Attorney, Agent, or Firm* — Carrier Blackman & Associates, P.C.; Joseph P. Carrier; William D. Blackman (57) ABSTRACT

A child seat mountable vehicle seat, includes: a seat skin including a front skin and a rear skin; a stitched portion; and a non-stitched portion formed in the stitched portion to define an opening from which a metal striker is projected. An extension portion of the front skin is turned over and extends forwards, while an extension portion of the rear skin extends forwards further than the metal striker. A trim plate is applied along an inner surface side of the rear skin, and in the non-stitched portion, the extension portion of the front skin is superposed on the extension portion of the rear skin with respect to a direction in which a latching device is moved to latch the metal striker.

18 Claims, 7 Drawing Sheets

CHILD SEAT MOUNTABLE VEHICLE SEAT

CROSS-REFERENCE TO RELATED APPLICATION(S)

This application claims priority from Japanese Patent Application No. 2009-297670 filed on Dec. 28, 2009, the entire contents of which are incorporated herein by reference.

BACKGROUND

1. Field of the Invention

The present invention relates to a child seat mountable vehicle seat in which a child seat is fixedly mounted on a sitting surface of a seat cushion by latching and locking latching devices of the child seat on metal staple-shaped strikers which project from the sitting surface of the seat cushion in positions lying closer to a rear portion of the seat cushion.

2. Description of the Related Art

There is discloses a vehicle seat in which a child seat is mountable (JP-2002-301963-A). In the vehicle seat, metal strikers are provided on a seat cushion frame in a rising posture, at a rear portion of a seat cushion. And, latching devices provided on the child seat are latched thereon (JP-2002-301963-A).

Each of the strikers has an inverted-U-shaped shaft. Openings are provided in a seat skin of the seat cushion at positions corresponding to the strikers. And, the inverted-U-shaped shafts of the strikers are caused to project from the openings to a sitting surface of the seat cushion.

When the latching devices are moved to latch the inverted-U-shaped shafts of the strikers, an edge of the seat skin defining the opening may enter an opening of the latching device to cause the biting of the seat skin by the latching device. Such entrance/biting should be prevented.

SUMMARY

One object of the invention is to provide a configuration for preventing the biting of a seat skin by a latching device at an edge of the seat skin defining an opening when moving the latching device to latch a striker in a configuration where a fasting shaft of the strider device projects to a sitting surface of a seat cushion from the opening provided in the seat skin.

According to a first aspect of the invention, there is provided a child seat mountable vehicle seat, including: a metal striker formed in a substantially inverted-U-shape and attached to a seat cushion frame to rise therefrom to be positioned at a rear portion of a seat cushion; a latching device of a child seat configured to latch the metal striker; a seat skin covering a cushion pad and including a front skin and a rear skin; a stitched portion formed by stitching together ends of the front skin and the rear skin; a non-stitched portion formed in the stitched portion to define an opening from which the metal striker is projected to a sitting surface side of the seat cushion; a trim plate having a width as wide as a longitudinal direction of the non-stitched portion and a length extending over the front skin and the rear skin, the trim plate including: two notched portions recessed from a front edge of the trim plate to respectively receive vertical shaft portions of the metal striker; a tongue portion defined between the notched portions to extend forwards further than the vertical shaft portions of the metal striker which are received in the notched portions; strip portions defined by the notched portions at lateral sides to extend forwards further than the vertical shaft portions of the metal striker; and a connecting portion connecting the tongue portion and the strip portions together to extend rearwards further than the vertical shaft portions of the metal striker; and belt-like portions extending from the ends of the front skin and the rear skin where the non-stitched portion is defined and each having a width corresponding to a width of the inverted U-shaped metal strike, wherein the belt-like portion of the front skin is turned over from the non-stitched portion towards an inner surface side of the front skin so as to extend forwards, while the belt-like portion of the rear skin extends forwards further than the vertical shaft portions of the metal striker, wherein the trim plate is applied along an inner surface side of the rear skin, the tongue portion of the trim plate is stitched to the belt-like portion of the rear skin which extends forwards further than the vertical shaft portions of the metal striker, the strip portions of the trim plate are stitched to ends of the non-stitched portion, and wherein, in the non-stitched portion, the belt-like portion of the front skin is superposed on the belt-like portion of the rear skin with respect to a direction in which the latching device is moved to latch the metal striker.

According to a second aspect of the invention, there is provided the child seat mountable vehicle seat, wherein the trim plate further includes a recessed cutout portion provided at a center of the connecting portion so as to extend forwards from a rear edge of the connecting portion and to have a width corresponding to a width of the latching device.

According to a third aspect of the invention, there is provided the child seat mountable vehicle seat, wherein the trim plate further includes a slit cutout portion provided in a center of the tongue portion so as to extend forwards from an inner edge of the recessed cutout portion.

According to a fourth aspect of the invention, there is provided the child seat mountable vehicle seat, wherein a trim cord is stitched transversely to the belt-like portion of the front skin which is turned over towards the inner surface side of the front skin.

According to the first aspect of the invention, in the seat skin of the child seat mountable vehicle seat, the opening is defined by the non-stitched portion so that the belt-like portion of the front skin is turned over from the non-stitched portion towards the inner surface side of the front skin so as to extend forwards, the belt-like portion of the rear skin is caused to extend forwards further than the vertical shaft portions of the metal striker, and the belt-like portion of the front skin is superposed on the belt-like portion of the rear skin with respect to the direction in which the latching device is moved to latch the metal striker. As a result, the edges of the front and rear seat skins which define the non-stitched portion do not enter the opening of the latching device as the latching device moved to latch the metal striker, thereby surely preventing the biting of the seat skin by the latching device.

Further, the beautifully-fringed non-stitched portion can be provided so as to withstand frequent latching movements of the latching device on the metal striker without deformation, by applying the trim plate along the inner surface side of the rear skin, stitching the tongue portion to the belt-like portion of the rear skin which extends forwards further than the vertical shaft portions of the metal striker and stitching the strip portions to both the ends of the non-stitched portion.

According to the second aspect of the invention, by forming the recessed cutout portion having the width corresponding to the width of the latching device in the trim plate at the center of the connecting portion so as to extend forwards from the rear edge of the connecting portion, the resistance to the latching movement of the latching device by the trim plate is suppressed to a lower level, and therefore, the latching movement of the latching device can be facilitated.

According to the third aspect of the invention, by further forming the slit cutout portion in the trim plate at the center of the tongue portion so as to extend forwards from the inner edge of the recessed cutout portion, the tongue portion of the trim plate which extends forwards further than the vertical shaft portions of the metal striker deflects in association with the latching movement of the latching device, and therefore, the latching movement of the latching device can be facilitated.

According to the fourth aspect of the invention, the trim cord is stitched transversely to the belt-like portion of the front skin of the seat skin which is turned over towards the inner surface side of the front skin. Therefore, the trim cord is held by a cushion pad, and even when the latching device is moved to latch the metal striker frequently, the belt-like portion of the front skin can be prevented from being turned back to be forced out of the opening defined by the non-stitched portion.

DETAILED DESCRIPTION

Figure 1:
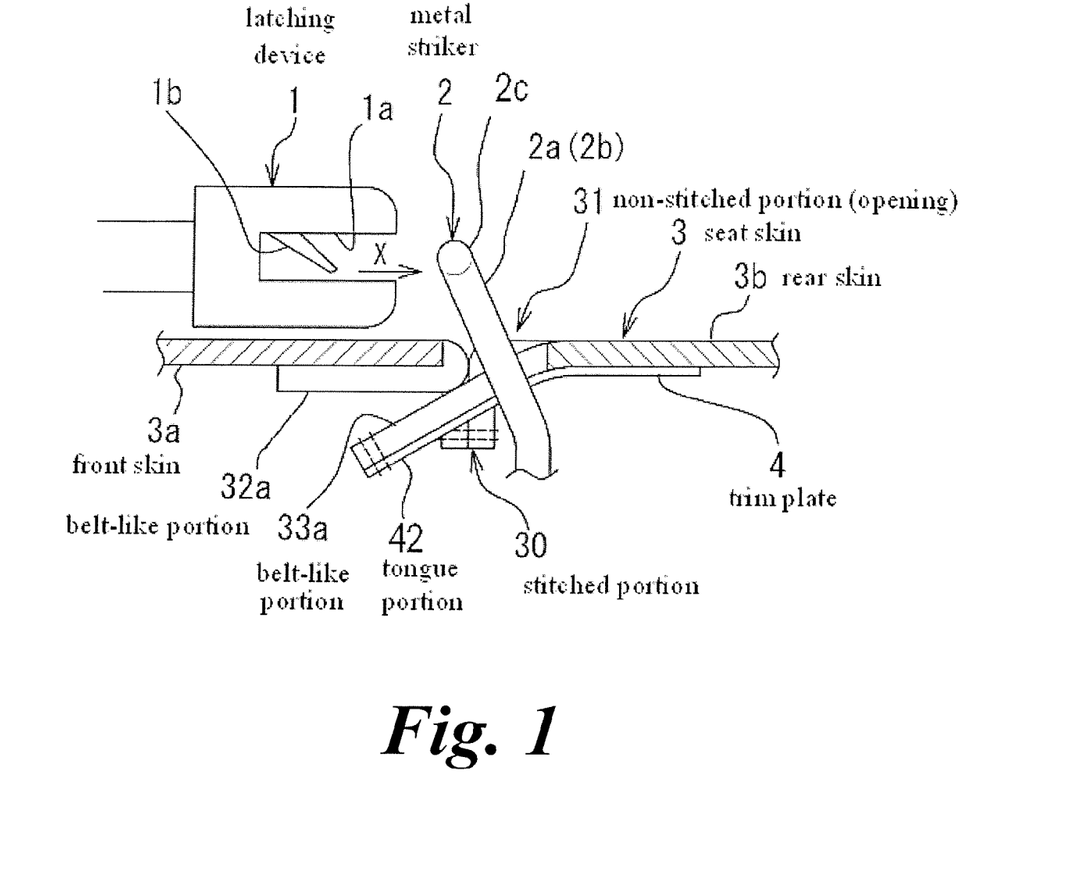
FIG. 1 illustrates an opening defined by a non-stitched portion provided in a seat skin of a child seat mountable vehicle seat according to an embodiment together with a latching device and a metal striker.

An embodiment exemplifies a rear seat on which a child seat (not shown) is mounted. The rear seat has a seat cushion (not shown) having a seat skin 3 formed of a front skin 3a and a rear skin 3b. Ends of the front skin 3a and the rear skin 3b are stitched together to form a stitched portion 30. And, a non-stitched portion 31 is provided in apart of the stitched portion 30. A metal striker 2 on which a latching device 1 of the child seat is to be latched is caused to project to a sitting surface side of the seat cushion through the non-stitched portion 31. Hereinafter, words such as "front" and "rear" denote directions towards the front and rear of a vehicle body, respectively.

An arm extends from a rear portion of the child seat, and the latching device 1 is attached to a rear end portion of the arm. This latching device 1 has a holding opening 1a to receive the metal striker 2 and a latch 1b to detachably engage with the metal striker 2. A pair of the latching devices 1 are provided on the rear portion of the child seat at left and right.

The metal striker 2 is formed by bending a metal shaft material into a substantially inverted U-shape like a staple. A pair of metal strikers 2 are attached to a seat cushion frame (not shown) at left and right. The metal strikers 2 are positioned on a rear portion of the seat cushion correspondingly with the latching devices 1. Each of the metal strikers 2 is assembled to the seat cushion frame so that shaft portions 2a, 2b, 2c which form the substantially inverted U-shape project to the sitting surface side of the seat cushion.

The seat skin 3 covers the seat cushion (not shown), and is hence assembled as a part of the seat cushion. A normal composite material can be used for the seat skin 3 in which real or artificial leather or cloth of a front surface side is laminated on wadding.

Figure 2:
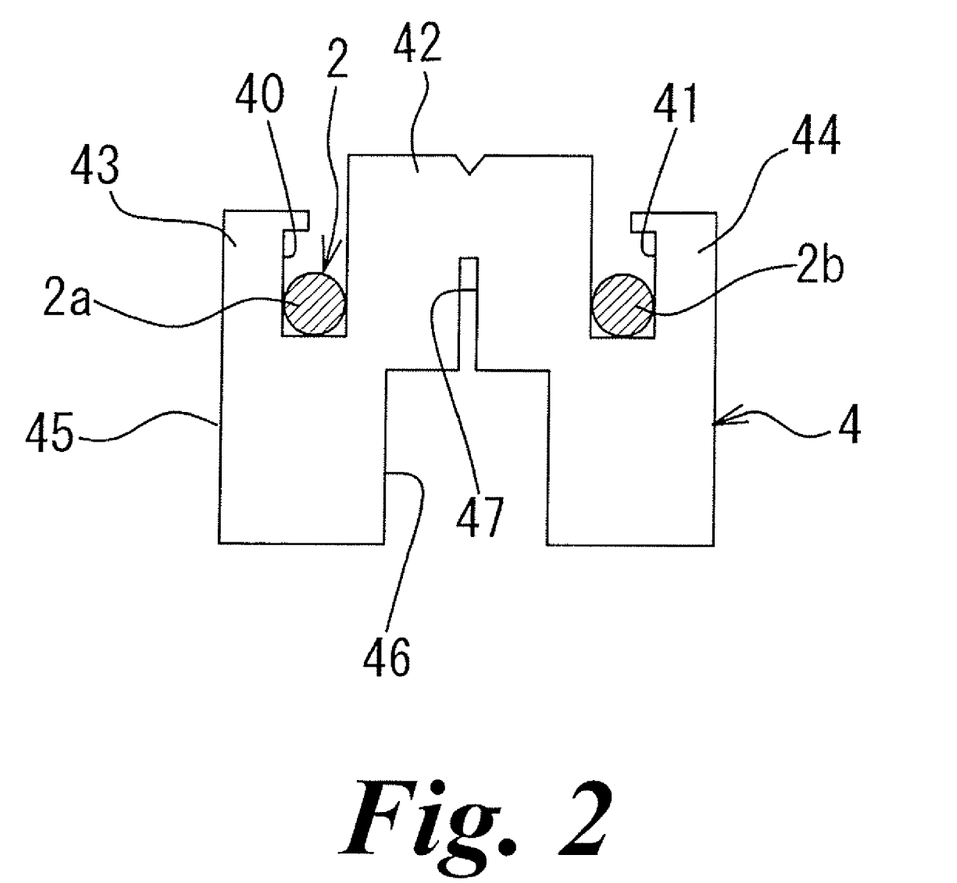
FIG. 2 is a plan view showing a trim plate that is to be stitched to the non-stitched portion.

A trim plate 4, which is formed of polypropylene, polyethylene or the like, is stitched to the non-stitched portion 31 of the seat skin 3. The trim plate 4 is formed into a plate shape which is as wide as a longitudinal length of the non-stitched portion 31 and extends over the front skin 3a and the rear skin 3b.

In the trim plate 4, two notched portions 40, 41 are formed to respectively receive the vertical shaft portions 2a and 2b of the metal striker. The notched portions 40, 41 extend rearwards from a front edge of the trim plate 4.

In the trim plate 4, a transversely central area defined between the notched portions 40, 41 forms a tongue portion 42. The tongue portion 42 extends forwards further than the vertical shaft portions 2a, 2b of the striker 2 in a state where the vertical shaft portions 2a, 2b are received in the notched portions 40, 41, respectively. In addition, lateral side areas defined by the notched portions 40, 41 respectively form strip portions 43, 44 which extend forwards further than the vertical shaft portions 2a, 2b. And, an area of the trim plate 4 which extends rearwards further than the vertical shaft portions 2a, 2b form a connecting portion 45 which connects the tongue portion 42 and the strip portions 43, 44 together.

Further, in the trim plate 4, a recessed cutout portion 46 having a width corresponding to a width of the latching device 1 is provided in a transversely central area of the connecting portion 45 so as to extend forwards to a longitudinal center of the trim plate 4 from a rear edge of the connecting portion 45, and a slit cutout portion 47 is provided in a center of the tongue portion 42 so as to extend forwards from an inner edge of the recessed cutout portion 46.

Figure 3A:
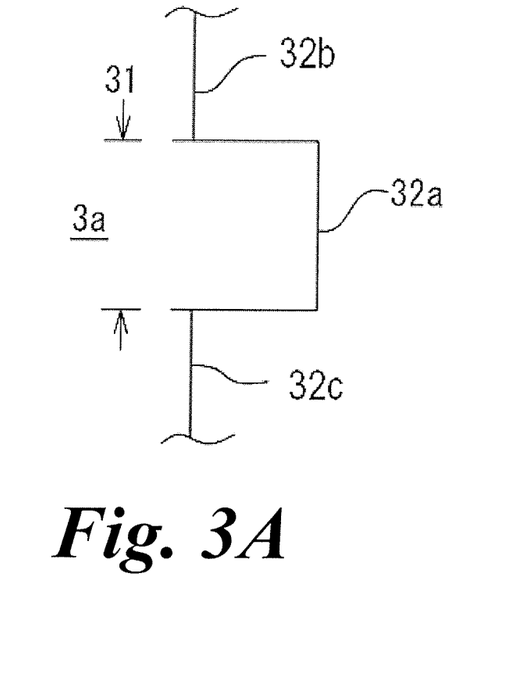
FIG. 3A is a plan view showing partially a front skin of the seat skin shown in FIG. 1.
Figure 3B:
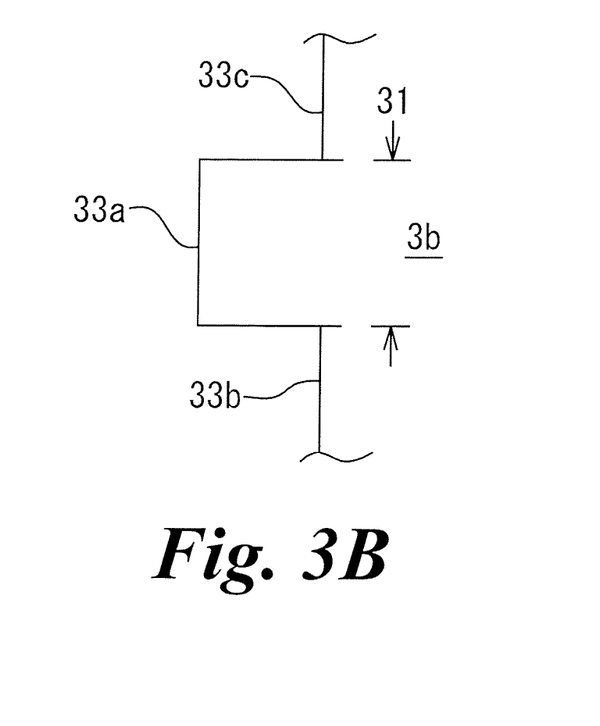
FIG. 3B is a plan view showing partially a rear skin of the seat skin shown in FIG. 1.

In the seat skin 3, a belt-like portion 32a is extended from an end portion of the front skin 3a as shown in FIG. 3A, and a belt-like portion 33a is extended from the rear skin 3b as shown in FIG. 3B. The end portions of the front and rear skins 3a, 3b from which the belt-like portions 33a, 33b extend correspond to the non-stitched portion 31. Each of the belt-like portion 32a and the belt-like portion 33a have a width corresponding to a width of the U-shape defined by the shaft portions 2a, 2b.

Figure 4:
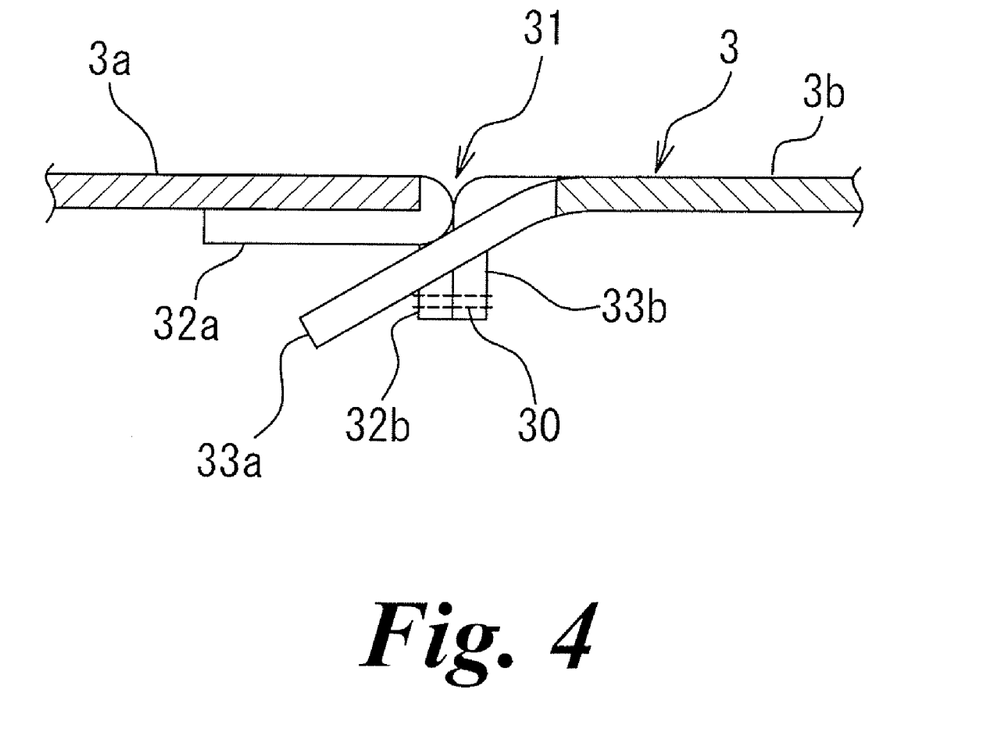
FIG. 4 illustrates the front skin and the rear skin shown in FIGS. 3A and 3B, respectively, as being stitched together.

In the front and rear skins 3a, 3b, stitching seams 32b, 32c, 33b, 33c are provided on both sides of the belt-like portions 32a, 33a, respectively. As shown in FIG. 4, these stitching seams 32b, 32c, 33b, 33c are stitched together to form the stitched portion 30 where the ends of the front skin 3a and the rear skin 3b are stitched together. And, the non-stitched portion 31 is provided in the stitched portion 30 at a position longitudinally corresponding to the vertical shaft portions 2a, 2b of the metal striker 2. The belt-like portion 32a of the front skin 3a is turned over from the non-stitched portion 31 towards an inner surface side of the front skin 3a and extends forwards, while the belt-like portion 33a of the rear skin 3b simply extend forwards further than the vertical shaft portions 2a, 2b of the metal striker (refer to FIG. 1).

Figure 5:
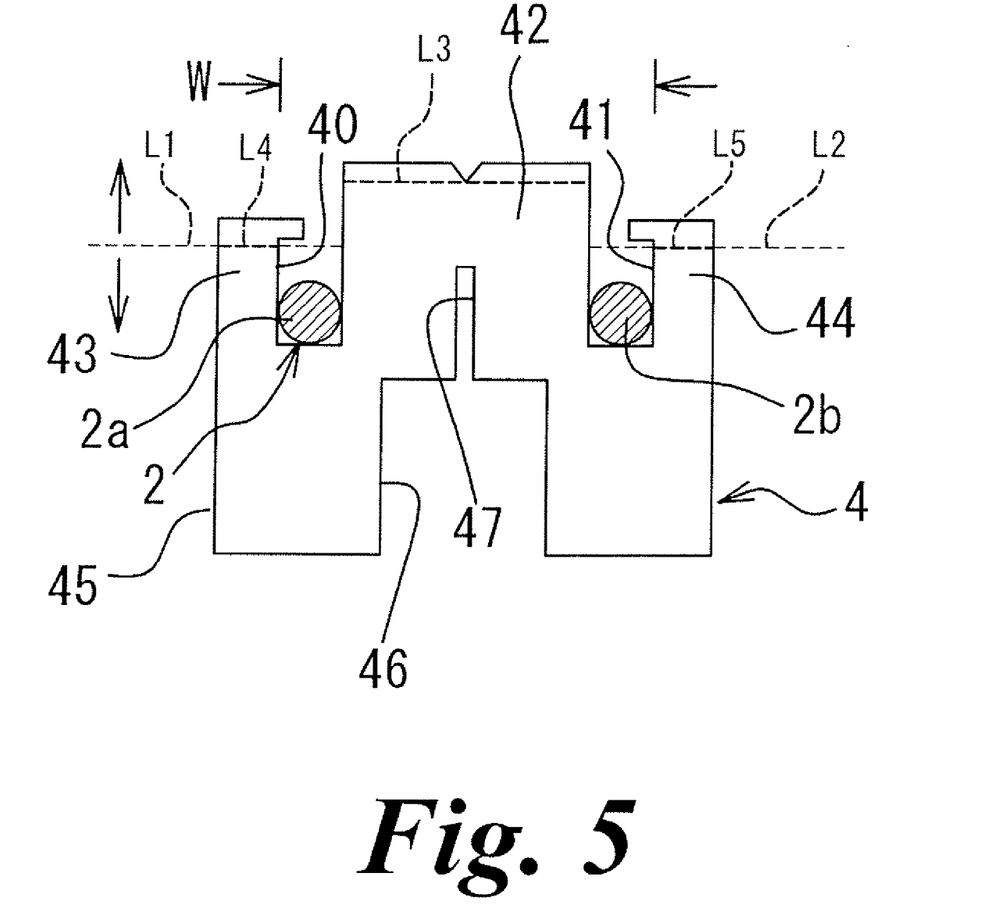
FIG. 5 is a plan view showing the trim plate shown in FIG. 2 as being stitched to the rear skin.

The trim plate 4 is disposed along an inner surface side of the rear skin 3b (refer to FIG. 1). Specifically, as shown in FIG. 5, the tongue portion 42 is stitched to the belt-like portion 33a of the rear skin 3b which extends forwards further than the vertical shaft portions 2a, 2b of the metal striker 2 at a front end edge (L3), and the strip portions 43, 44 to both ends of the non-stitched portion 31 having a width W (L4, L5). L1, L2 denote the stitched portion 30 where the ends of the front skin 3a and the rear skin 3b are stitched together.

Figure 6:
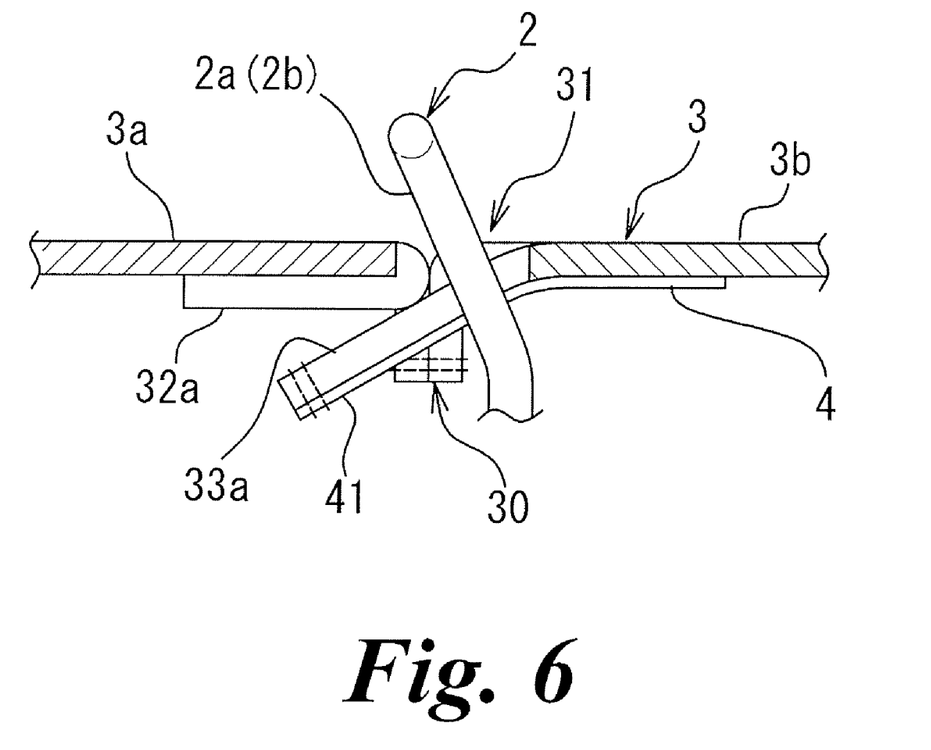
FIG. 6 illustrates the opening defined by the non-stitched portion provided in the seat skin shown in FIG. 1 together with the metal striker.

As a result of stitching the trim plate 4 to the seat skin 3, as shown in FIG. 6, the seat skin 3 is provided with an opening defined by the non-stitched portion 31 in which the upper-side belt-like portion 32a of the front skin 3a is superposed on the lower-side belt-like portion 33a of the rear skin 3b, with respect to a direction in which the latching device 1 is moved to latch the metal striker 2 (as shown in the arrow X in FIG. 1). And, the shaft portions 2a, 2b, 2c of the metal striker 2 which form the substantially inverted U-shape are projected to the sitting surface side of the seat cushion from the non-stitched portion 31.

In the child seat mountable vehicle seat according to the embodiment, since the non-stitched portion 31 is provided in which the belt-like portion 32a of the front skin 3a which is turned over from the non-stitched portion 31 towards the front is superposed on the upper side and the belt-like portion 33a of the rear skin 3b which is caused to extend forwards further than the vertical shaft portions 2a, 2b of the metal striker 2 is superposed on the loser side with respect to the direction X in which the latching device 1 is moved to latch the metal striker 2, the edges of the front and rear seat skins which define the non-stitched portion 31 do not enter the opening 1a of the latching device 1 as the latching device 1 moved to latch the metal striker 2, thereby surely preventing the biting of the seat skin by the latching device 1.

Further, the beautifully-fringed non-stitched portion 31 can be provided so as to withstand frequent latching movements of the latching device 1 on the metal striker without deformation, by applying the trim plate 4 along the inner surface side of the rear skin 3b, stitching the tongue portion 42 to the belt-like portion 33a of the rear skin 3b which extends forwards further than the vertical shaft portions 2a, 2b of the metal striker 2 and stitching the strip portions 43, 44 to both the ends of the non-stitched portion 31.

Still further, since resistance to the latching movement of the latching device 1 by the trim plate 4 can be suppressed to a low level by providing the recessed cutout portion 46 having the width corresponding to the width of the latching device 1 in the transversely central area of the connecting portion 45 so as to extend to the longitudinally central portion from the rear edge of the connecting portion 45, thereby facilitating the latching movement of the latching device 1. And, since the tongue portion 42 of the trim plate 4 which extends forwards further than the vertical shaft portions 2a, 2b of the metal striker 2 deflects in association with the latching movement of the latching device 1 by providing the slit cutout portion 47 in the transverse center of the tongue portion 42 so as to extend to the longitudinal center thereof from the inner edge of the recessed cutout portion 46, the latching movement of the latching device can be further facilitated.

Figure 7A:
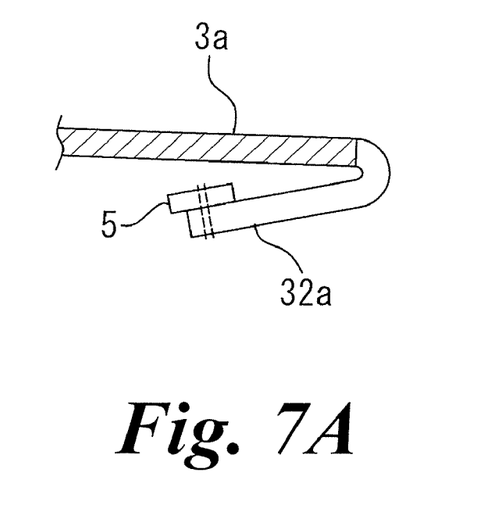
FIG. 7A illustrates a trim cord as being stitched to the front skin shown in FIG. 3A.
Figure 7B:
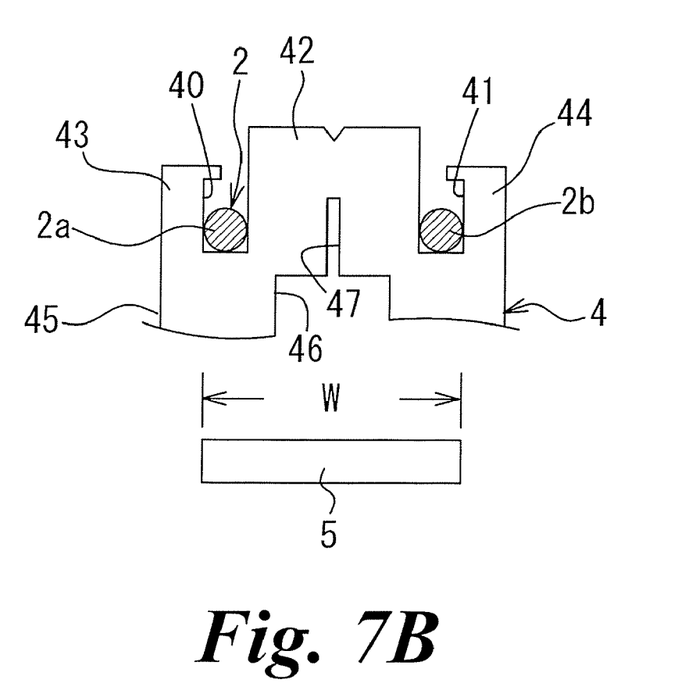
FIG. 7B illustrates the front skin shown in FIG. 7A based on a stitching range of the trim cord.

In the embodiment, as shown in FIGS. 7A, 7B, a trim cord 5 can be stitched transversely to the belt-like portion 32a of the front skin 3a which is turned over towards the inner surface side of the front skin 3a. This trim cord 5 may be stitched transversely along a front end edge of the belt-like portion 32a so as to substantially match a width W of the non-stitched portion 31. Since the trim cord is held by a cushion pad, even when the latching device is moved to latch the metal striker frequently, the belt-like portion of the front skin can be prevented from being turned back to be forced out of the opening defined by the non-stitched portion.

What is claimed is:

1. A child seat mountable vehicle seat, comprising:
   a metal striker formed in a substantially inverted-U-shape, attached to a seat cushion frame to rise therefrom to be positioned at a rear portion of a seat cushion, and configured to selectively engage with a latching device of a child seat;
   a seat skin covering a cushion pad and including a front skin and a rear skin;
   a stitched portion formed by stitching together ends of the front skin and the rear skin;
   a non-stitched portion formed in the stitched portion to define an opening from which the metal striker is projected to a sitting surface side of the seat cushion;
   a trim plate having a width as wide as a longitudinal direction of the non-stitched portion and a length extending over the front skin and the rear skin, the trim plate including:
      two notched portions recessed from a front edge of the trim plate to respectively receive vertical shaft portions of the metal striker;
      a tongue portion defined between the notched portions to extend forwards further than the vertical shaft portions of the metal striker which are received in the notched portions;
      strip portions defined by the notched portions at lateral sides to extend forwards further than the vertical shaft portions of the metal striker; and
      a connecting portion connecting the tongue portion and the strip portions together to extend rearwards further than the vertical shaft portions of the metal striker; and
   extension portions extending from the ends of the front skin and the rear skin where the non-stitched portion is defined and each having a width corresponding to a width of the inverted U-shaped metal striker,
   wherein the extension portion of the front skin is turned over from the non-stitched portion towards an inner surface side of the front skin so as to extend forwards, while the extension portion of the rear skin extends forwards further than the vertical shaft portions of the metal striker,
   wherein the trim plate is applied along an inner surface side of the rear skin, the tongue portion of the trim plate is stitched to the extension portion of the rear skin which extends forwards further than the vertical shaft portions of the metal striker, the strip portions of the trim plate are stitched to ends of the non-stitched portion,
   wherein, in the non-stitched portion, the extension portion of the front skin is superposed on the extension portion of the rear skin with respect to a direction in which the latching device is moved to latch the metal striker, and
   wherein the trim plate further includes a recessed cutout portion provided at a center of the connecting portion so as to extend forwards from a rear edge of the connecting portion and to have a width corresponding to a width of the latching device.

2. The child seat mountable vehicle seat of claim 1,
   wherein the trim plate further includes
      a slit cutout portion provided in a center of the tongue portion so as to extend forwards from an inner edge of the recessed cutout portion.

3. The child seat mountable vehicle seat of claim 1,
   wherein a trim cord is stitched transversely to the extension portion of the front skin which is turned over towards the inner surface side of the front skin.

4. The child seat mountable vehicle seat of claim 1, wherein a front edge of the tongue portion extends further forward than the front edges of the strip portions.

5. The child seat mountable vehicle seat of claim 1,
wherein each of the strip portions include a projection projecting towards the tongue portion, and
wherein a projecting amount of each of the projections is less than a radius of each of the vertical shaft portions.

6. The child seat mountable vehicle seat of claim 1, wherein the tongue portion includes a notch at the front edge thereof.

7. A seat skin for covering a cushion pad of a child seat mountable vehicle seat, comprising:
a front and rear skin;
a stitched portion formed by stitching together ends of the front skin and the rear skin;
a non-stitched portion formed in the stitched portion to define an opening that accommodates a projection therethrough of a metal striker formed in a substantially inverted-U-shape, which is attached to a seat cushion frame to rise therefrom to be positioned at a rear portion of a seat cushion and is configured to selectively engage with a latching device of a child seat;
a trim plate having a width as wide as a longitudinal direction of the non-stitched portion and a length extending over the front skin and the rear skin, the trim plate including:
two notched portions recessed from a front edge of the trim plate to respectively receive vertical shaft portions of the metal striker;
a tongue portion defined between the notched portions to extend forwards further than the vertical shaft portions of the metal striker which are received in the notched portions;
strip portions defined by the notched portions at lateral sides to extend forwards further than the vertical shaft portions of the metal striker; and
a connecting portion connecting the tongue portion and the strip portions together to extend rearwards further than the vertical shaft portions of the metal striker; and
extension portions extending from the ends of the front skin and the rear skin where the non-stitched portion is defined and each having a width corresponding to a width of the inverted U-shaped metal striker,
wherein the extension portion of the front skin is turned over from the non-stitched portion towards an inner surface side of the front skin so as to extend forwards, while the extension portion of the rear skin extends forwards further than the vertical shaft portions of the metal striker,
wherein the trim plate is applied along an inner surface side of the rear skin, the tongue portion of the trim plate is stitched to the extension portion of the rear skin which extends forwards further than the vertical shaft portions of the metal striker, the strip portions of the trim plate are stitched to ends of the non-stitched portion,
wherein, in the non-stitched portion, the extension portion of the front skin is superposed on the extension portion of the rear skin with respect to a direction in which the latching device is moved to latch the metal striker, and
wherein the trim plate further includes a recessed cutout portion provided at a center of the connecting portion so as to extend forwards from a rear edge of the connecting portion and to have a width corresponding to a width of the latching device.

8. The seat skin of claim 7,
wherein the trim plate further includes
a slit cutout portion provided in a center of the tongue portion so as to extend forwards from an inner edge of the recessed cutout portion.

9. The seat skin of claim 7, wherein a trim cord is stitched transversely to the extension portion of the front skin which is turned over towards the inner surface side of the front skin.

10. The seat skin of claim 7, wherein a front edge of the tongue portion extends further forward than the front edges of the strip portions.

11. The seat skin of claim 7,
wherein each of the strip portions include a projection projecting towards the tongue portion, and
wherein a projecting amount of each of the projections is less than a radius of each of the vertical shaft portions.

12. The seat skin of claim 7, wherein the tongue portion includes a notch at the front edge thereof.

13. A trim plate for a seat skin that covers a cushion pad of a child seat mountable vehicle seat, comprising:
two notched portions recessed from a front edge of the trim plate to respectively receive vertical shaft portions of a metal striker that is formed in a substantially inverted-U-shape and that is attached to a seat cushion frame to rise therefrom to be positioned at a rear portion of a seat cushion and that is configured to selectively engage with a latching device of a child seat;
a tongue portion defined between the notched portions to extend forwards further than the vertical shaft portions of the metal striker which are received in the notched portions;
strip portions defined by the notched portions at lateral sides to extend forwards further than the vertical shaft portions of the metal striker; and
a connecting portion connecting the tongue portion and the strip portions together to extend rearwards further than the vertical shaft portions of the metal striker,
wherein the trim plate is configured to be attached to a seat skin covering a cushion pad,
wherein the seat skin includes a front skin and a rear skin,
wherein a stitched portion is formed on the seat skin by stitching together ends of the front skin and the rear skin,
wherein a non-stitched portion is formed in the stitched portion to define an opening through which the metal striker projects to a sitting surface side of the seat cushion,
wherein the trim plate has a width as wide as a longitudinal direction of the non-stitched portion and a length extending over the front skin and the rear skin,
wherein the seat skin includes extension portions extending from the ends of the front skin and the rear skin where the non-stitched portion is defined, each having a width corresponding to a width of the inverted U-shaped metal striker,
wherein the extension portion of the front skin is turned over from the non-stitched portion towards an inner surface side of the front skin so as to extend forwards, while the extension portion of the rear skin extends forwards further than the vertical shaft portions of the metal striker,
wherein the trim plate is applied along an inner surface side of the rear skin, the tongue portion of the trim plate is stitched to the extension portion of the rear skin which extends forwards further than the vertical shaft portions of the metal striker, the strip portions of the trim plate are stitched to ends of the non-stitched portion, wherein, in the non-stitched portion, the extension portion of the front skin is superposed on the extension portion of the rear skin with respect to a direction in which the latching device is moved to latch the metal striker, and wherein the trim plate further includes a recessed cutout portion provided at a center of the connecting portion so as to extend forwards from a rear edge of the connecting portion and to have a width corresponding to a width of the latching device.

14. The trim plate of claim 13, further comprising a slit cutout portion provided in a center of the tongue portion so as to extend forwards from an inner edge of the recessed cutout portion.

15. The trim plate of claim 13, wherein a trim cord is stitched transversely to the extension portion of the front skin which is turned over towards the inner surface side of the front skin.

16. The trim plate of claim 13, wherein a front edge of the tongue portion extends further forward than the front edges of the strip portions.

17. The trim plate of claim 13,
wherein each of the strip portions include a projection projecting towards the tongue portion, and
wherein a projecting amount of each of the projections is less than a radius of each of the vertical shaft portions.

18. The trim plate of claim 13, wherein the tongue portion includes a notch at the front edge thereof.

* * * * *